United States Patent [19]

Baba et al.

[11] Patent Number: 4,723,570
[45] Date of Patent: Feb. 9, 1988

[54] WATER FAUCET

[75] Inventors: Yasushi Baba; Masahiro Aoki, both of Osaka, Japan

[73] Assignee: Kabushiki Kaisha Naniwa Seisakusho, Osaka, Japan

[21] Appl. No.: 947,219

[22] Filed: Dec. 23, 1986

[30] Foreign Application Priority Data

Dec. 24, 1985 [JP] Japan .......................... 60-201989[U]
Jan. 10, 1986 [JP] Japan .......................... 61-2465[U]
Feb. 12, 1986 [JP] Japan .......................... 61-19261[U]

[51] Int. Cl.$^4$ .............................................. F16K 25/00
[52] U.S. Cl. .............................. 137/454.5; 137/454.6; 137/614.18; 137/614.2
[58] Field of Search ............... 137/454.2, 454.5, 454.6, 137/614.18, 614.2; 25/231, 235

[56] References Cited

U.S. PATENT DOCUMENTS

| | | | |
|---|---|---|---|
| 1,856,664 | 5/1932 | Steen | 137/454.6 |
| 2,508,843 | 5/1950 | Semak | 137/454.2 X |
| 3,330,294 | 7/1967 | Manning | 137/454.6 X |
| 3,439,701 | 4/1969 | Stella | 137/454.5 X |
| 3,589,397 | 6/1971 | Wagner | 137/614.2 |
| 4,185,659 | 1/1980 | Bernat | 137/454.6 X |
| 4,314,673 | 2/1982 | Rudelick | 137/614.2 X |
| 4,478,249 | 10/1984 | Fleischmann | 137/454.6 X |

Primary Examiner—Harold W. Weakley
Attorney, Agent, or Firm—Millen & White

[57] ABSTRACT

A water tap cartridge to be mounted on the barrel of a compression-type faucet essentially consisting of an inlet portion communicating with a water supply pipe, an outlet portion forming a tap hole, a horizontal dowel seat portion horizontally extending and forming a partitioning wall between said inlet portion and outlet portion and a cylindrical rise-up portion extending vertically above said dowel seat portion, said rise-up portion being provided with a packing retaining thread on its top exterior surface, which comprises a cylinder having a flange portion, said cylinder being such that its lower end seats on said seat portion and its flange abuts the top end of said cylindrical rise-up portion when the cartridge is mounted on the faucet barrel, a cap nut adapted to be screwed onto said packing retaining thread with said flange being interposed therebetween so as to fix said cartridge rigidly with respect to the barrel, said cylinder having an orifice which is brought into communication with said outlet portion as the cartridge is so mounted and fixed in position, a vertically slidable piston installed within said cylinder through O-ring means, and a lever means secured fixedly to said piston.

3 Claims, 5 Drawing Figures

WATER FAUCET

BACKGROUND OF THE INVENTION

1. Field of the Invention

The present invention relates to a water faucet. More particularly, the present invention relates to a cylinder-stem single-tap cartridge which utilizes the compression-type water tap barrel installed at the faucet.

2. Description of the Prior Art

As is well known, the water faucet is used as connected to the terminal end of a water supply pipe and designed to be operable at a maximum service pressure of 7.5 kg/cm$^2$. As it is used in conjunction with tap water utility service, the faucet must meet the applicable specifications. For example, it has been specified that the material for the faucet barrel should be cast bronze.

Water faucets may be structurally classified into the compression type faucet in which the opening and closing action of the valve is made by the screwing of the stem bar, the plug type faucet in which the opening and closing action is effected by rotating the valve shaft through 90 degrees, the self-closing type faucet in which the valve is manually opened, with closure being effected by a spring force or water pressure, and the ball-tap faucet in which a ball acting as a float in water closes or opens the valve. Of these various types of faucets, the faucet which is most prevalently used is the compression-type faucet. This type of faucet is simple in construction, available at low cost, and least susceptible to mechanical failure but is disadvantageous in that as the packing dowel is compressed at every closing action, the useful life of the dowel is very short. Furthermore, there is the inconvenience that the stem bar must be advanced or receded along a threaded guide by means of a suitable handle or knob. To overcome the above-mentioned disadvantages of a compression type faucet, the present inventors contemplated the application of a single-lever cylinder stem construction, which is well known as the hot and cold water mixing tap from Japanese Utility Model Publication No. 56-26134 and No. 56-30785, for instance, to a single-tap water faucet. However, a single lever hot-and-cold water mixing faucet of the cylinder stem type is complicated in construction and, compared with the common compression type faucet, has the disadvantage of high production cost. On the other hand, the single-tap water faucets described in Japanese patent Publication No. 59-34308 and Japanese Utility Model Publication No. 59-7427, for instance, utilize the barrel of the existing compression type water faucet but still have the above-mentioned drawbacks of the conventional compression-type faucet.

SUMMARY OF THE INVENTION

The above-mentioned problems have been overcome by the present invention which provides a single-lever-type cylinder-stem cartridge which utilizes the barrel used in the existing compression type faucet without any modification.

BRIEF DESCRIPTION OF THE DRAWING

The well-known conventional compression type faucet barrel A is described below. Referring to FIG. 3, this barrel comprises an inlet portion 30 which is to be connected to a water supply pipe (not shown), an outlet portion 31 which constitutes a tap hole, a horizontal dowel seat 32 which is a partitioning member that divides said inlet portion 30 and outlet portion 31 from each other and a cylindrical rise-up portion 33 extending overhead said dowel seat 32, the inner wall of said cylindrical rise-up portion 33 being provided with a thread engageable with a stem rod (not shown) carrying a dowel 34 removably attached to its end. Moreover, the external periphery of said cylindrical rise-up portion 33 is provided with a packing retaining screw 36 and the outer periphery of said inlet portion 30 is provided with an abutting flange 37 and a joint screw 38.

The single-tap cartridge B according to a first embodiment of the present invention which is to be attached to the existing barrel A has the following construction. Referring to FIG. 1, the cartridge B has a cylinder member 1, the diameter of which is slightly less than the crest diameter of the stem thread 35. The cartridge B is mounted in position by inserting said cylinder member 1 from the top opening of said cylindrical rise-up portion 33 until it is seated on the horizontal dowel seat 32 of the barrel A. This cylinder member 1 has a flange 2 on its outer periphery in a position substantially corresponding to the distance from the top surface of the dowel seat 32 to the open end of said rise-up portion 33. With said flange 2 interposed, a cap nut 3 (corresponding to the packing retainer of the conventional faucet) is screwed onto said packing retainer thread 36. By means of the thread provided around the top periphery of said cylinder above said flange 2, a first fixing nut 4 is screwed in position.

Figure 1:
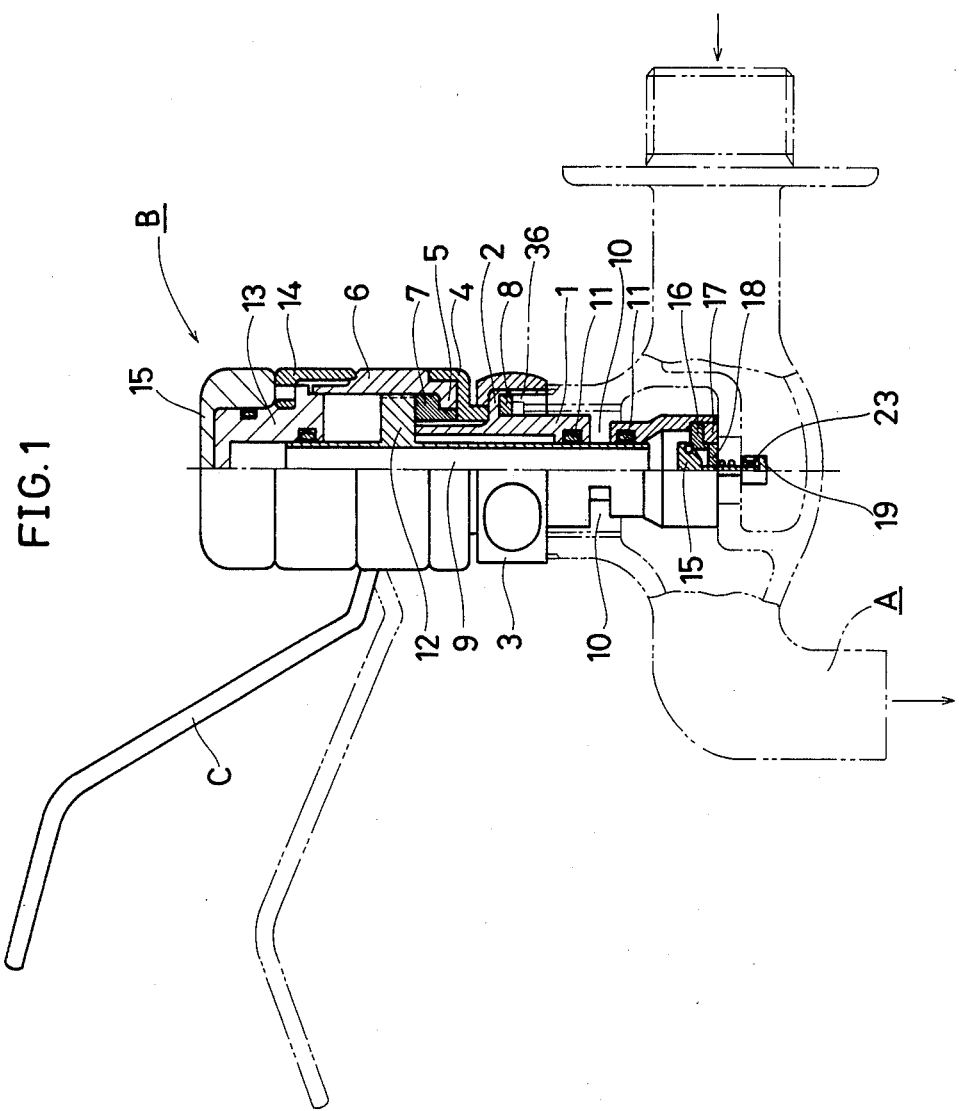
FIG. 1 is a cross-sectional view showing a single-tap cartridge embodying the principle of the present invention as mounted on the existing compression-type faucet barrel.

The fixing nut 4 is loosely fitted with a lever fulcrum case 6 having an engaging portion 5. With this engaging portion 5 interposed, a second fixing nut 7 is screwed onto the thread of the cylinder 1. Therefore, by screwing the cap nut 3 onto the packing retainer thread 3 of the barrel A through an installation packing 8, the cylinder 1 is secured in position on the dowel seat 32.

A pipe-shaped piston 9 which corresponds to the stem is loosely mounted on the cylinder 1 for free vertical sliding movement. O-rings 11, 11 are provided above and below a pair of openings 10 which are cut out below an intermediate point of said cylinder 1 and a piston 9 is loosely fitted through said O-rings 11. In a vertically intermediate position of said piston 9, a fulcrum metal 12 is secured fixedly and a single lever C is fixed to this fulcrum metal 12 in such a manner that it may swing vertically about said fulcrum lever case 6.

The outer periphery of said fulcrum lever case 6 is provided with a thread and a balance case 13 is fitted and mounted. A retaining nut 14 is screwed onto the thread of said fulcrum lever case 6, with said balance case 13 being supported therebetween. The forward end of said piston extends into this balance case 13.

On top of said balance case 13 is removably mounted a decorative cap 15.

To prevent back-flow of faulty water into the water supply pipe when a hose or the like is connected to the outlet 31, a check valve may be provided in the present embodiment. Thus, the lower end of said cylinder 1 is increased in diameter and a dowel 15 is seated on the lower end. Then, a check valve holder 16 secured to the cylinder 1 and a packing 17 are inserted from below. To this packing 17, a multi-orifice receiving metal 18 is force-fitted. And a shank 19 of the dowel 15 is inserted into the receiving metal 18. The shank 19 is pre-energized downwards by a spring 23. The dowel 15 is opened against the force of the spring 23 only when the tap is opened.

Having the above-described construction, the present embodiment operates as follows. First, the installation of the cartridge B on the barrel A of the existing compression-type faucet is explained. The packing retainer and stem rod of the faucet are removed and the dowel is taken out. Then, the cartridge B according to the present embodiment is inserted onto the dowel seat 32 of the barrel A and secured in position with the cap nut 3.

To open the faucet, the lever C is depressed downward, whereupon the fulcrum metal 12 ascends and the piston 9 integral therewith rises. As a result, the piston 9 opens the opening 10 of the cylinder 1 so that the tap water available above the dowel seat 32 is let out from the outlet 31. In connection with the depression of the lever C, since the piston 9 is a pipe-like element, the entry of the piston 9 into the balance case 13 does not cause a resistance so that the manipulation of the lever C needs no undue force. By controlling the degree of depression of the lever C, the amount of opening at the opening 10 and, hence, the amount of tap can be freely adjusted.

To close the tap, the lever C is raised in a manner opposite to the above opening procedure.

Figure 2:
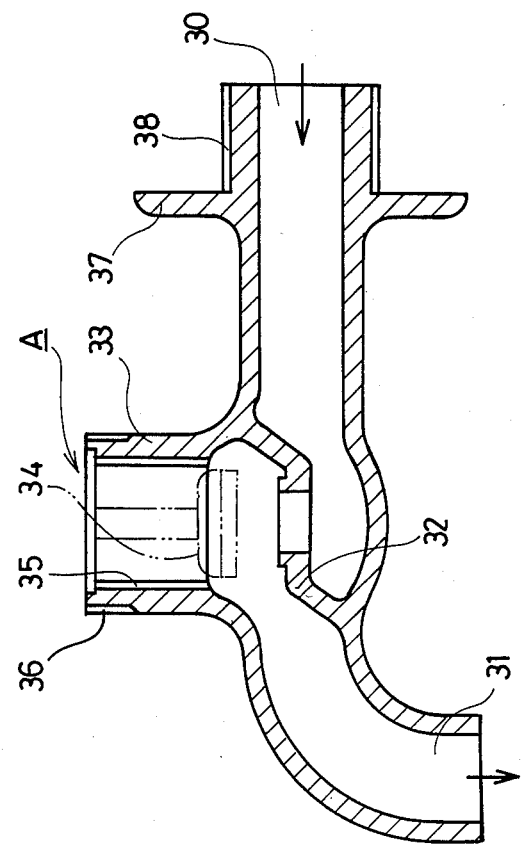
FIG. 2 is a cross-sectional view showing the conventional compression-type faucet.
Figure 3:
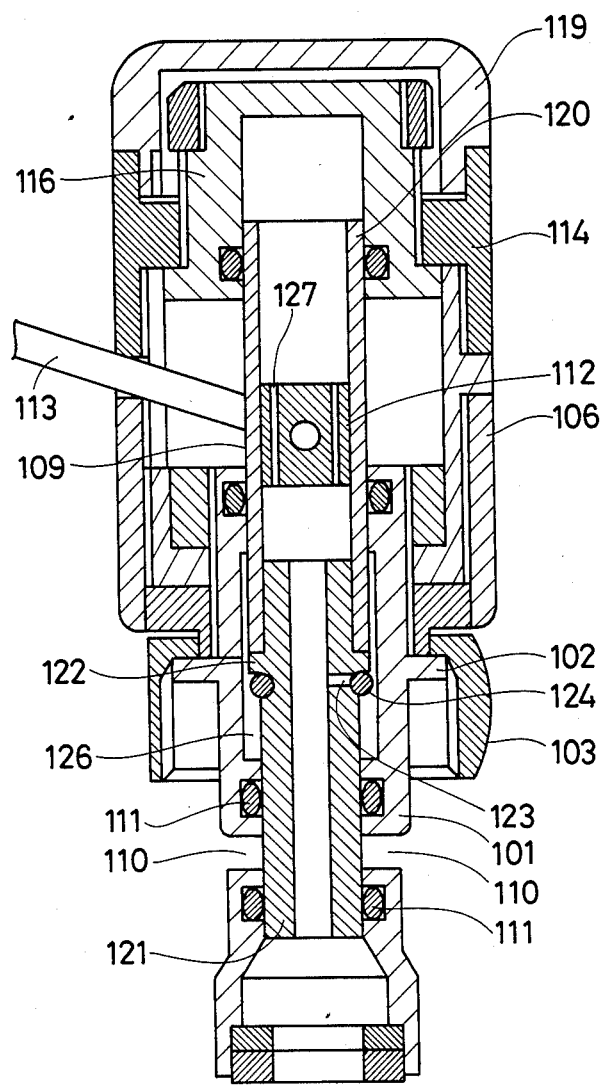
FIG. 3 is a cross-sectional view showing a further embodiment of the present invention which is a tap cartridge equipped with water-hammer preventive means.

The cartridge B' having a top branch passageway as a second embodiment of the present invention has the following construction. Referring to FIG. 2 in which the like numerals indicate the like parts in FIG. 1, a branch case 26 is provided in lieu of the retaining nut 14. This branch case 26 is screwed onto the thread of the fulcrum lever case 6 and a branch rotary element 25 is loosely mounted on the branch case 26. Screwed to this branch case 26 from above is a balance case 13 so as to support a branch rotary element 25.

Figure 4:
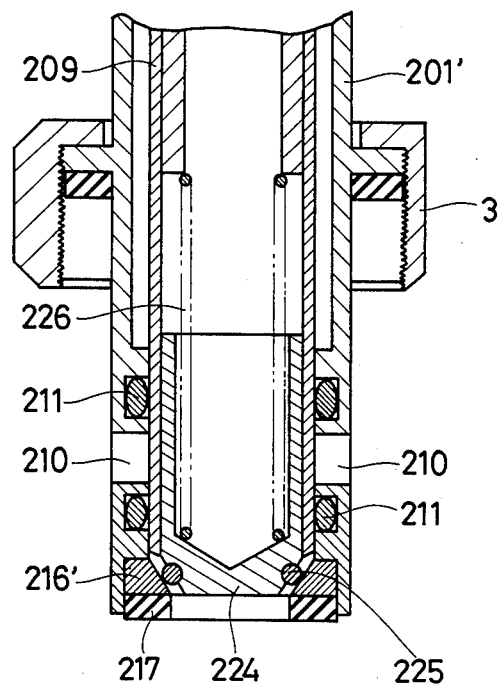
FIG. 4 is a cross-sectional view showing a still another embodiment of the present invention which is a tap cartridge equipped with means for preventing backflow of tap water.

A third embodiment of the present invention is illustrated in FIG. 4. In this embodiment, the following provisions against water hammer are included. Thus, a pipe-shaped piston 109 consists of an upper pipe 120 and a lower pipe 121 which is smaller in outer diameter than said upper pipe 120, with the upper pipe 120 being threaded onto the lower pipe 120 and the lower end of the upper pipe 121 being abutted against a flange 122 provided partway on the periphery of the lower pipe 121. The flange 122 is provided with a slot 123 on the bottom side thereof and an O-ring 124 is disposed around the lower pipe 121 to plug the slot 123.

Then, at an intermediate position on the inner surface of the cylinder 101, an expanded portion with an internal diameter greater than the outer diameter of the upper and lower pipes to form an annular dead space 126 which functions as an accumulator which communicates with the inside of the piston 109 via said slot 123.

Therefore, to open the faucet, the lever 113 is depressed downward, whereupon the fulcrum 112 ascends and the piston 109 integral therewith rises. As a result, the piston 109 opens the opening 110 of the cylinder 101 so that the tap water available above the dowel seat is let out from the outlet. In connection with the depression of the lever 113, since the piston 109 is a pipe-like element and the fulcrum is provided with a slot 127, the entry of the piston 109 into the balance case 116 does not cause a resistance so that the manipulation of the lever 113 needs no undue force. By controlling the degree of depression of the lever 113, the amount of opening at the opening 110 and, hence, the amount of tap can be freely adjusted.

To close the faucet, the lever 113 is raised in a manner opposite to the above opening procedure. As the lever 113 is depressed downward, the piston 119 ascends. At this time, in the dead space 126, the large-diameter upper pipe 120 rises away and the small-diameter lower pipe 121 enters instead, so that the volume of the space increases, whereupon the tap water in the piston 109 flows in, expanding the O-ring 124. On the other hand, as the lever 113 is pushed upward, the piston 109 descends. At this time, the volume of the dead space 126 is conversely diminished so that the tap water in this dead space 126 is allowed to return into the piston 109 only very gradually because the O-ring 124 plugs the slot 123 under pressure, with the result that the raising operation of the lever becomes heavy and the closure of the opening 110 of the piston 109 becomes slow to prevent the water-hammer.

Figure 5:
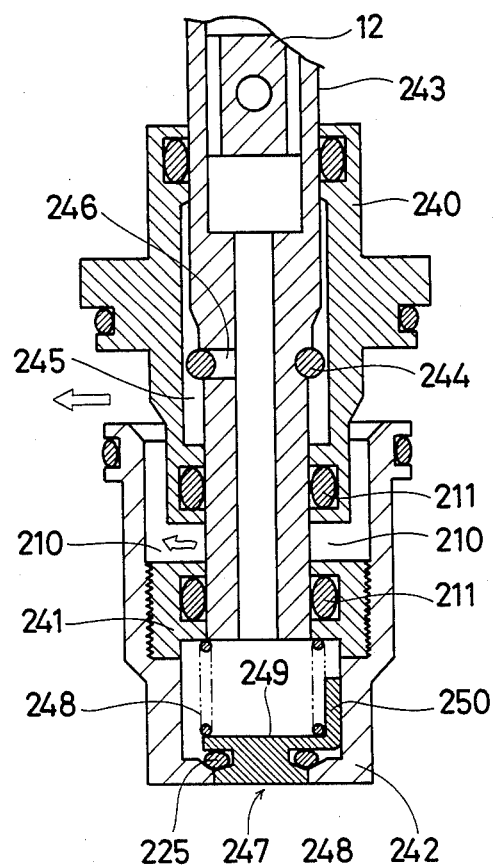
FIG. 5 is a cross-sectional view showing a further embodiment of the present invention which is a tap cartridge equipped with another backflow-preventive means.

Now, the counter flow-preventing device in a fifth embodiment is illustrated in FIG. 5. Unlike in the first embodiment, a cylinder 201' is not increased in diameter at its lower end. To the lower end of the cylinder 201', there is secured a check valve holder 216' with a cement and a packing smaller in diameter than the cylinder 201' is inserted from below and compressed against it. In a pipe-shaped piston 209 adapted to slide vertically within said cylinder 201', a poppet valve 224 is slidably installed. The outer periphery at the lower end of said poppet valve 224 is fitted with an O-ring 225, through which said poppet valve 224 is abutted against said check valve holder 216'. Built into said poppet valve 224 is a spring 226 which biases the poppet valve 224 towards the check valve holder 216'.

Therefore, as the piston 209 is raised by means of the lever, the opening 210 is opened and the poppet valve 224 is also raised against the spring 226 under the water supply pressure, so that tap water flows out from the opening 210. If, for whatever reason, the water supply pressure drops, the poppet valve 224 is closed by the spring 226 to prevent backflow.

A six embodiment of the present invention is shown in FIG. 6. A cylinder 240 is increased in diameter at the lower end 241, which is provided with a thread for engaging a sub-cylinder 242. In this cylinder 240 is loosely fitted a piston 243 which differs in diameter between an upper portion and a lower portion, with an O-ring fitted at the boundary. This O-ring 244 moves vertically within a compression chamber 245 of said cylinder 240, and tap water flows in and out of this compression chamber 245 through a throttled orifice 246, whereby an abrupt opening and closing effect of the piston 243 is avoided.

A check valve body 247 is preenergized by a spring 248, the upper end of which is supported by said portion 241. This check valve body 247 is disc-shaped to fit with an orifice of said sub-cylinder 242, but a spring-receiving surface 249 is rectangular and fitted with a plurality of sliding poles 250. Thus, as the water supply pressure raises the check valve body 247 against the biasing force of the spring 248, the check valve body 247 ascends with the poles 250 utilizing the inner surface of the sub-cylinder 242 as a guide.

Having the construction set forth above and claimed in the appended claims, the present invention offers the following advantageous results.

(1) As a cylinder stem-type cartridge is mounted on the barrel of the existing conventional compression type faucet, the present invention provides a low-cost single-tap faucet. Moreover, while the conventional compression-type faucet is routinely maintained with dowel replacement by removing the pipe retainer, stem rod and dowel, the cylinder-stem cartridge can be easily installed in the same manner. Thus, the present invention makes for ease of installation. Furthermore, the present faucet is a cylinder-stem single-tap faucet, it does not involve the compression of the rubber packing in the compression type faucet so that a longer useful life of O-rings can be expected. In addition, the movement of the stem is vertical, the operation is easier in comparison with the rotating of the stem rod in the ordinary compression type faucet.

(2) As the cylinder is secured in position to the rise-up portion of the barrel with the cylinder flange gripped by the cap nut which is screwed on by means of the thread of the packing retainer, no special fastening member is required and even the layman can mount the cartridge on the barrel. Moreover, as the construction is simple, the cost of the faucet is further reduced.

(3) As the flange and the lower end of the cylinder are secured in abutment with the cap nut, the installation is simple and yet the connection is sturdy enough, with no detachment in use.

What is claimed is:

1. A water tap cartridge for use in conjunction with the barrel of a compression-type water faucet by mounting thereon, said faucet barrel defining an inlet portion connected to a water supply pipe, outlet portion having a discharge spout, a horizontally extending partition wall dividing the interior of said barrel into said inlet portion and outlet portion, said partition wall centrally defining an aperture therethrough, and an upstanding portion defining a bore vertically extending from said outlet portion in alignment with said aperture, said upstanding portion defining an open top end and a threaded portion on its exterior surface adjacent said open top end, said cartridge comprising, in combination:
   a cylindrical housing having a lower portion to be received in the bore of said upstanding portion, an upper portion and an outwardly extending annular flange separating said lower portion from said upper portion, said lower portion having a length generally corresponding to the distance between said partition wall and said open top end within said outlet portion of the faucet barrel and defining orifice means communicating with said outlet portion, said flange being adapted to bear against said open top end and the lower end of said cylindrical housing being adapted to bear against said partition wall around said aperture when the cartridge is mounted on the faucet barrel;
   a retainer nut threadly engageable with said threaded portion of the upstanding portion for rigidly securing said cylindrical housing by pressing said flange and an associated packing against said open top end of said upstanding portion with said upper portion of the cylindrical housing outwardly protruding therethrough;
   a piston having upper and lower ends, the piston slidably received in said cylindrical housing for selectively opening and closing said orifice means, said piston defining an axially extending fluid passage for providing fluid communication between the ends thereof;
   actuator lever means operatively connected to said piston for the axial sliding movement of said piston within said cylindrical housing; and
   closure means for closing the upper end of said cylindrical housing, said closure means defining a cavity for receiving the top end of said piston whereby the fluid pressure is equalized within said cavity and the lower portion of said cylindrical housing.

2. The water tap cartridge as claimed in claim 1, wherein there is provided an accumulator for smoothening the operation of said piston and said actuator lever means, said accumulator comprising a small gap defined between a portion of said cylindrical housing and said piston, said piston defining a channel providing fluid communication between said small gap and said fluid passage.

3. The water tap cartridge as claimed in claim 1, wherein said cylindrical housing comprises a check valve at the lower end thereof for preventing backflow when the fluid pressure in said inlet portion is lower than that of said outlet portion.

* * * * *